US 6,310,766 B1

(12) United States Patent
Bae

(10) Patent No.: US 6,310,766 B1
(45) Date of Patent: Oct. 30, 2001

(54) LATCHING APPARATUS FOR A PORTABLE COMPUTER

(75) Inventor: Jae-Yong Bae, Suwon (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/039,324

(22) Filed: Mar. 16, 1998

(30) Foreign Application Priority Data

Mar. 15, 1997 (KR) .................................................. 97-4857

(51) Int. Cl.[7] ................................ H05K 5/00; H05K 7/00
(52) U.S. Cl. .......................... 361/681; 361/683; 361/686; 292/18; 292/209; 312/223.1
(58) Field of Search .................................... 361/681, 683, 361/686; 312/223.1; 292/279, 274, 209, 210, 18

(56) References Cited

U.S. PATENT DOCUMENTS

| 3,709,538 | * | 1/1973 | Seitz et al. ............................ 292/128 |
| 4,294,496 |   | 10/1981 | Murez . |
| 4,758,031 |   | 7/1988 | Wolf . |
| 4,828,299 | * | 5/1989 | Poe ........................................ 292/139 |
| 5,168,429 |   | 12/1992 | Hosoi . |
| 5,198,966 |   | 3/1993 | Kobayashi et al. . |
| 5,255,154 | * | 10/1993 | Hosoi et al. ........................... 361/680 |
| 5,490,036 |   | 2/1996 | Lin et al. . |
| 5,497,296 |   | 3/1996 | Satou et al. . |
| 5,576,929 |   | 11/1996 | Uchiyama et al. . |
| 5,580,107 |   | 12/1996 | Howell . |
| 5,644,469 | * | 7/1997 | Shioya et al. ......................... 361/681 |
| 5,761,030 | * | 6/1998 | Roscoe .................................. 361/684 |
| 5,764,480 | * | 6/1998 | Crump et al. ......................... 361/685 |

* cited by examiner

Primary Examiner—Gerald Tolin
Assistant Examiner—Tung Minh Bui
(74) Attorney, Agent, or Firm—Robert E. Bushnell, Esq.

(57) ABSTRACT

A device for securely engaging a display panel with a base in a closed position is provided for use with a portable computer that may be constructed of both a base and a display panel that is pivotally mounted on the base. The base and the display panel combine to form the chassis of the portable computer. The device for engaging the display panel and the base in a closed position prevents the display panel from being damaged when the portable computer is being moved, stored, or shipped. The device consists of a recess for mounting a latching assembly and a latching assembly. The latching assembly supports a latch that secures the display panel to the base when the cover is in a folded down, or closed or recessed, position. The latch assembly comprises a recess that is formed in the display panel that receives the latch assembly. There is also a seat formed on the base that corresponds to the opening on the cover. To secure the display panel and the base in a closed position, the latch assembly is inserted into the recess and then coupled to the seating area on the base. A holding member is integrally formed with the latch assembly that and allows the latch assembly to be stably mounted in the recess. An elastic member is fastened to the latch assembly to prevent the latch from detaching without pressure being applied on a button area.

27 Claims, 5 Drawing Sheets

LATCHING APPARATUS FOR A PORTABLE COMPUTER

CLAIM OF PRIORITY

This application makes reference to, incorporates the same herein, and claims all rights accruing thereto under 35 U.S.C. §119 through my patent application entitled *Latching Apparatus and Portable Computer Having the Same* earlier filed in the Korean Industrial Property Office on the 15th day of March 1997 and there duly assigned Ser. No. 1997/04857.

BACKGROUND OF THE INVENTION

1. Field of the Invention

The present invention relates to a latch assembly and, more specifically, to a latch assembly for a portable computer that secures a display panel to a main body housing the computer.

2. Background Art

Portable computers having a keyboard and flat panel type of display have become increasingly popular. This type of portable computer may be constructed using both a base and a display panel. The display panel is pivotally mounted on a base that contains a microcomputer. A latch assembly is provided to protect the display panel from being damaged when the portable computer is transported or is not in use. When the display panel is folded down onto the base, the latch assembly allows the display panel to be secured to the base. The latch assembly may be constructed of a latch, a seat, and a push button. The latch and the push button are provided on an internal side surface of the display panel, and the seat is provided on a top surface of the base. The latch may be operated by manually depressing a button.

Different techniques for securing a display panel to a base are shown, for example, in U.S. Pat. No. 5,198,966 to Kobayashi entitled *Apparatus Including a Rotatable Latch Mechanism Having an Attaching Structure for Holding a Movable Member in a Closed Position*, U.S. Pat. No. 5,255,154 to Hosoi entitled *Portable Electronic Apparatus With a Latch Mechanism Including an Interlock*, U.S. Pat. No. 5,580,107 to Howell entitled *Hidden Latch Hook for Portable Personal Computer and the Like*, U.S. Pat. No. 4,758,031 to Wolf entitled *Retractable Safety Latch for Cases*, U.S. Pat. No. 5,576,929 to Uchiyama entitled *Structure Having a Latch Mechanism Engaging an Intermediate Coverandan Outer Cover and Lifting the Intermediate Cover by Deformation of Elastic Member*, U.S. Pat. No. 5,490,036 to Lin entitled *Portable Computer With Tillable Keyboard Structure Having Releasably Engageable Latch Assembly Members*, U.S. Pat. No. 4,294,496 to Murez entitled *Portable Computer Enclosure*, U.S. Pat. No. 5,168,429 to Hosoi entitled *Electronic Apparatus Having a Slidable Pawl for Removably Connecting a Display Housing to a Base Housing*, and U.S. Pat. No. 5,497,296 to Satou entitled *Electronic Apparatus With Hinged Display and Latch Mechanism for Releasably Latching Display in Closed Position*. I have found that contemporary art does not provide a securing technique that is relatively simple to assemble and resistant to wear. Sometimes a latch will not release properly from the main body because the latch assembly has become worn and dysfunctional. Installing a latch assembly is often inconvenient to because of the complicated structure of the latch assembly.

As such, I believe it may be possible to improve on the prior art by providing a device for securing a display panel to a main body that is easier to assemble because the latching assembly simply slides into position inside of the display panel, that has a simple design, that is less subject to wear, and is economical to manufacture.

SUMMARY OF THE INVENTION

Accordingly, it is an object of the present invention to provide an improved latch assembly for a portable computer.

It is another object to provide a latch assembly for a portable computer that is simpler to incorporate into the manufacture of portable computers because the latching assembly simply slides into position inside of the display panel without needing any additional fasteners to be secured in place.

It is still another object to provide a latch assembly for a portable computer that has superior wear characteristics that allow the latch assembly to have an increased lifespan.

It is yet another object to provide a latch assembly that can be economically manufactured.

To achieve these and other objects, a device for securely engaging a display panel to a base while in a closed position is provided for use with a portable computer that may be constructed of both a base and a display panel that is pivotally mounted on the base. The base and the display panel combine to form the chassis of the portable computer. The device for engaging the display panel and the base in a closed position prevents the display panel from being damaged when the portable computer is being moved, stored, or shipped. The device has a recess for mounting a latching assembly. The latching assembly supports a latch that secures the display panel to the base when the cover is in a folded down, or closed or recessed, position. The latch assembly is received in a recess that is formed in the display panel. A seat is formed on the base that corresponds to the opening on the cover. To secure the display panel and the base in a closed position, the latch assembly is inserted into the recess and then coupled to the seat or seating area on the base. A catch is integrally formed with the latch assembly, and allows the latch assembly to be securely mounted in the recess. An elastic member is fastened to the latch assembly to prevent the latch from detaching without the manual application of pressure on a button by a user.

According to a second embodiment of the present invention, a portable computer having a base containing a microcomputer has a pivotally mounted display panel. The display panel may be constructed with a front housing and a back housing. A recess is integrally formed with the back housing and an opening is located on the front surface of the front housing. A seat or seating area is formed on the top surface of the base that corresponds to the opening. A latch assembly is inserted into the recess. A catch is integrally formed with the latch assembly to allow the latch assembly to a be mounted to the recess. An elastic member is integrally formed with the body to allow the latch to be removed from the cavity in the seating recess in the base when manual pressure is applied to the button area.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE DRAWINGS

Figure 1:
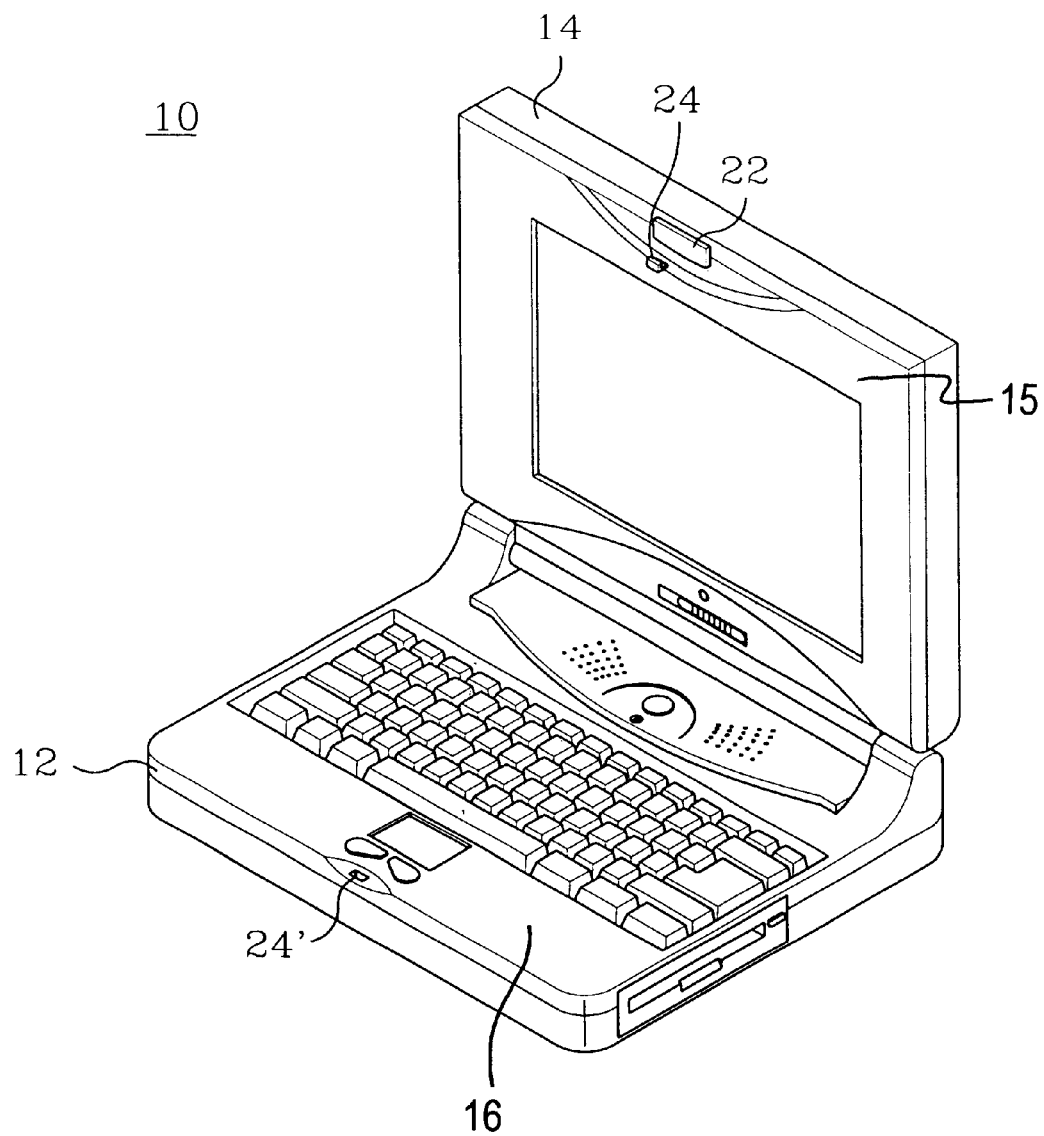
FIG. 1 is a perspective view showing a portable computer equipped with an installed latch assembly.

Turning now to the drawings, FIG. 1 illustrates a portable computer that may be constructed using base 12 and display panel 14. Display panel 14 is pivotally mounted on base 12 that contains a microcomputer (not shown). A latch assembly protects display panel 14 from being damaged, by securing the panel in a closed position, when portable computer 10 is being transported or stored for shipping. When display panel 14 is folded down on base 12, the latch assembly allows display panel 14 to be secured to base 12. The latch assembly has latch 24, seat 24' and push button 22. Latch 24 and push button 22 are provided on an internal side surface 15 of display panel 14, and seat 24' is positioned on surface 16 of base 12. Latch 24 may be operated by push button 22.

Figure 2:
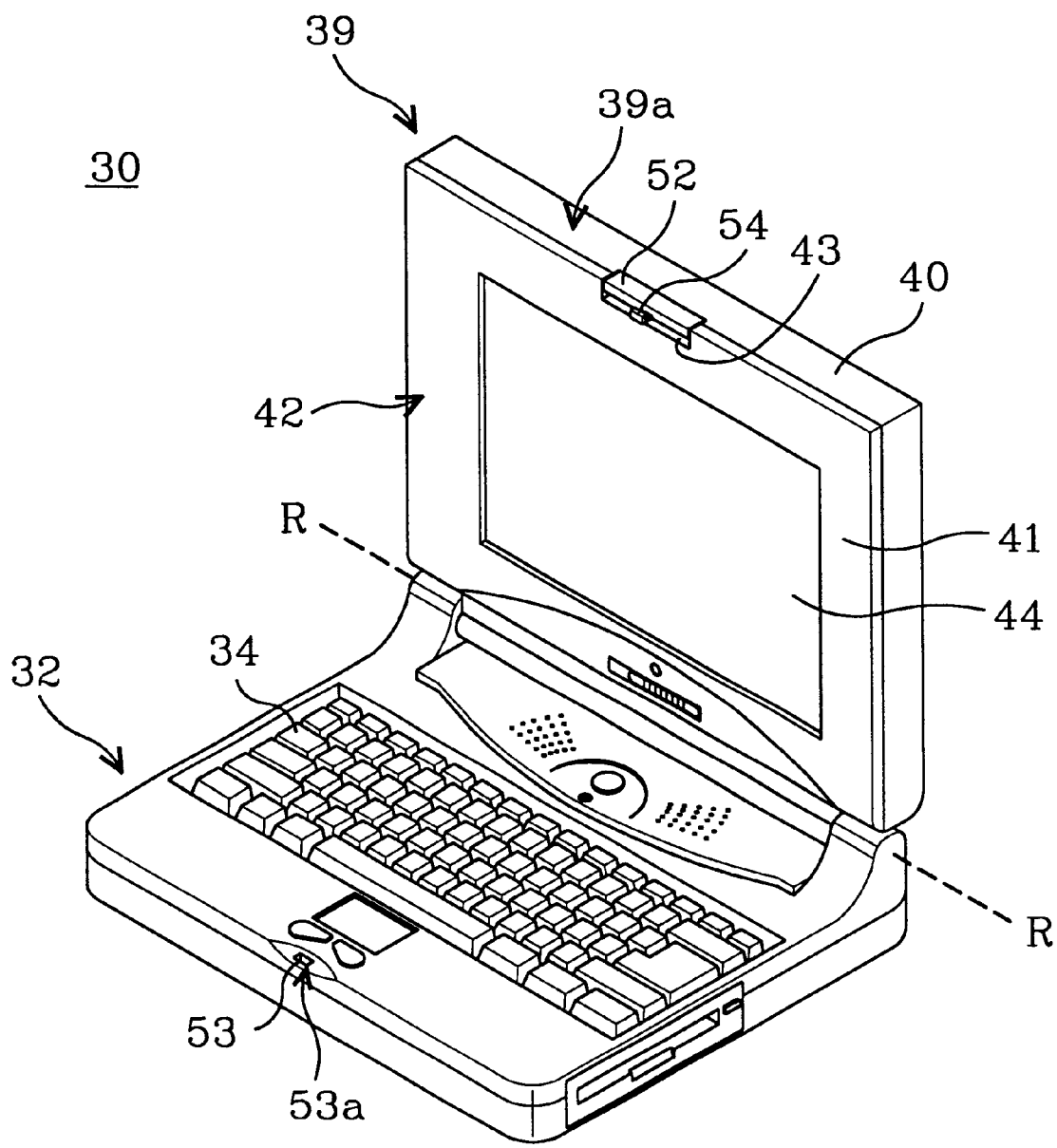
FIG. 2 is a perspective view showing a portable computer equipped with a latch assembly according to the principles of the present invention.

FIG. 2 illustrates a portable computer 30 having a chassis including a display panel or monitor 39 and a main body or base 32 with a device for securing display panel or monitor 39 to base or main body 32 in a closed position as constructed according to the principles of the present invention. Portable computer 30 may be constructed using main body or base 32 that contains a memory and a microcomputer (not shown) and supports an input means, such as keyboard 34. Display panel or monitor 39 is pivotally mounted to main body or base 32 and pivots about an axis of rotation R and the display panel or monitor 39 may be folded down and latched to main body or base 32 via the securing device. Display panel or monitor 39 is provided with display assembly 44, such as a variable visual display device, on a front surface or front side 42 thereof. Also, monitor or display panel 39 may be constructed using a monitor housing including front housing 41 and back housing 40.

Figure 3:
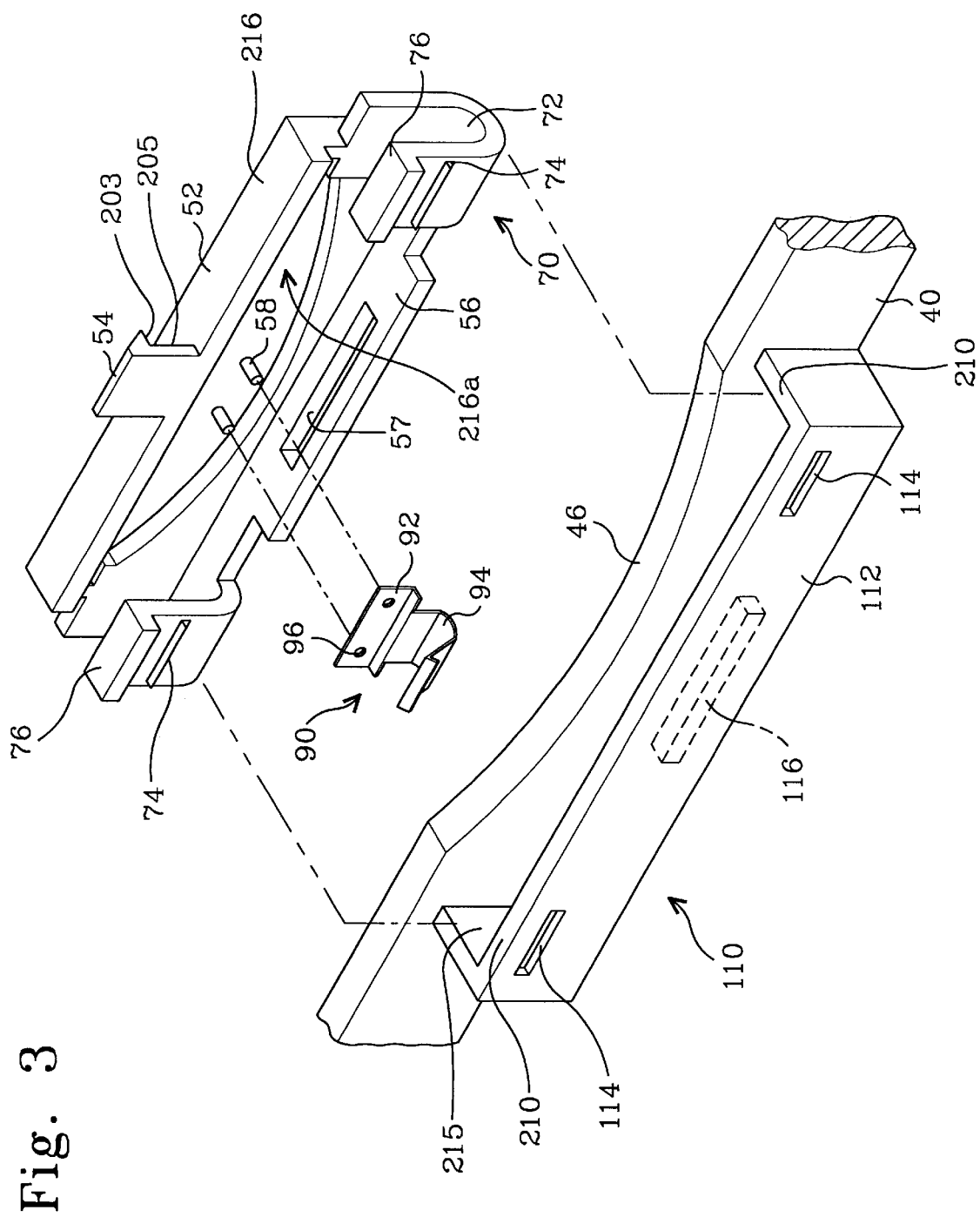
FIG. 3 is an exploded perspective view of the latch assembly shown in FIG. 2.

The device for securing a display panel to a base in a closed position, as constructed according to the principles of the present invention, is shown in FIG. 3. The device may be constructed using mounting receptacle or recess 110, located in the monitor or display panel 39, latch assembly 52, holding member 56 and elastic member 70. Mounting receptacle or recess 110 is provided with opening 215 and is integrally formed in back housing 40. More specifically, mounting receptacle or recess 110 is positioned on the inside top plate of back housing 40 at distal end 39a of the display panel or monitor 39 opposite from the axis of rotation R between the display panel or monitor 39 and the main body or base 32. Opening 215 is formed facing toward a front surface of front housing 41 to receive latch assembly 52. An inclined portion 46 is formed on the top surface of back housing 40.

Protrusion or protruding number 116 is formed on a bottom of mounting receptacle or recess 110 and slots 114 are formed in sidewall 112. Latch assembly 52, holding member 56, and elastic member 70 are integrally formed or connected.

Latch 54 is attached on top surface 216 of the body of latch assembly 52. The body of latch assembly 52 has, for example, two rectangular blade shaped portions attached along a common edge to form top surface 216 and a side surface 216a, respectively, of the body of latch assembly 52. Latch 54 can be inserted or received into cavity 53 to be coupled with the cavity 53 in a seat 53a (see FIG. 5). The front surface of latch assembly 52 is located on inclined portion 46 of mounting receptacle or recess 110 and serves as button that can be pressed to release the latch from the main body or base 32 of the portable computer.

Holding member 56 is attached to the bottom of latch assembly 52, holding member 56 having a blade shape, for example. When the latch assembly is inserted into mounting receptacle or recess 110 in the monitor or display panel 39, slit 57 in holding member 56 engages protrusion or protruding member 116 in the mounting recess or receptacle 110 to stabilize the latch assembly 52. Protrusion or protruding member 116 is located in the bottom of mounting receptacle or recess 110. Thus, holding member 56 is fixedly mounted to latch assembly 52, when latch assembly 52 is inserted into mounting receptacle or recess 110. On both side surfaces of holding member 56 a U-shaped elastic member 70 is formed. U-shaped elastic member 70 has U-shaped section 72 that provides the latch assembly with some elasticity. Once the latch assembly is engaged with the mounting receptacle or recess 110, leg 76 is positioned over surface 210 of the mounting recess and rib 74 of the U-shaped elastic member 70 is engaged with slot 114 in sidewall 112 of the mounting receptacle or recess 110. Leg 76 allows U-shaped elastic member 70 to be stably positioned in mounting recess 110. Additionally, rib 74 is positioned below leg 76 and coupled with the slot 114 that is formed in sidewall 112 of mounting receptacle or recess 110. Rib 74 is provided to secure U-shaped elastic members 70 in mounting receptacle or recess 110.

The latch assembly 52 may further have spring member 90 that is mounted to latch assembly 52, spring member 90 being of a generally U-shape, for example, as illustrated in FIG. 3. A plate type spring having bending portion 94 and fixing portion 92 is used as spring member 90. It should be understood that any elastic member could suffice for serving as the spring member 90. Along fixing portion 92 of spring member 90 are located two holes 96 that are coupled with two bosses 58 attached on side surface 216a of the body of latch assembly 52. The monitor or display panel 39 is disengaged from the main body or base 32 when pressure is applied on side surface 216a of the latch assembly 52 to compress the spring member 90 and disengage the latch 54 within the cavity 53 from seat 53a of main body or base 32.

Figure 4:
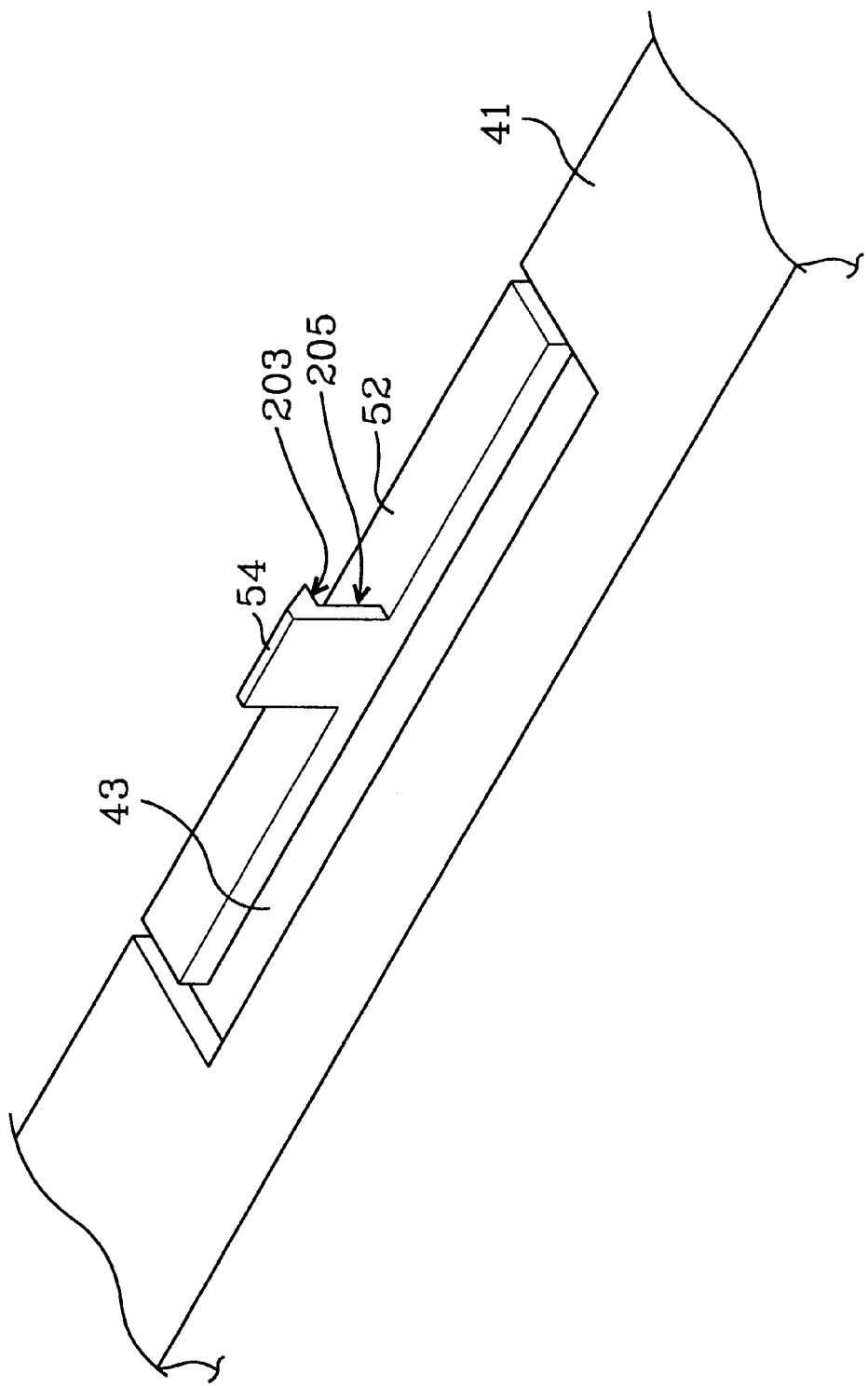
FIG. 4 is a perspective view of the latch assembly of FIG. 2 installed in part of the display panel of the portable computer.

As shown in FIG. 4, front housing 41 has space 43 that latch assembly 52 is positioned in space 43. Latch 54 of latch assembly 52 can be slightly displaced so that the latch can be decoupled and detached within cavity 53 from seat 53a in base 32.

Figure 5:
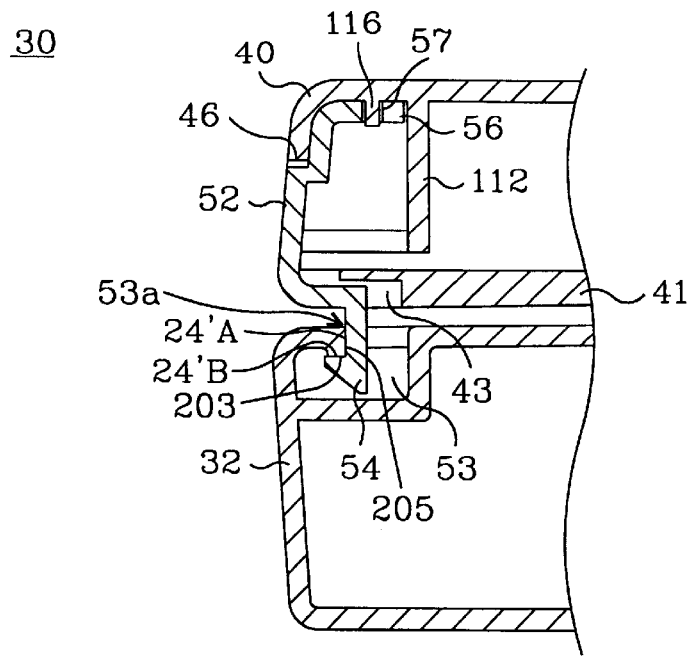
FIG. 5 is a cross-sectional view of a part of the portable computer that illustrates the display panel being connected to the base by the latch assembly of FIG. 2.
Figure 6:
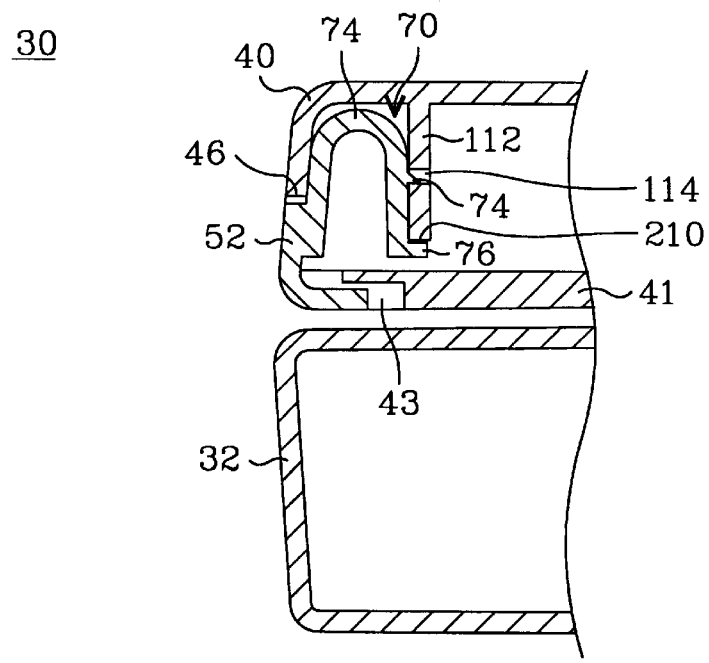
FIG. 6 is a cross-sectional view of an elastic member of the latch assembly of FIG. 2 while the display panel is folded onto the base.

FIG. 5 shows monitor or display panel 39 folded down on main body or base 32 and latch 54 coupled in cavity 53 with seat 53a of base 32. While latch 54 is in cavity 53 engaged with seat 53a, surface 203 of the latch 54 is in contact with seating surface 24'B of seat 53a of the main body or base 32 and surface 205 of the latch 54 is in contact with seating surface 24'A of seat 53a of the main body or base 32. If latch 54 is in contact with seat 53a, it can be smoothly moved back and coupled to seat 53a because holding member 56 is fixed to protrusion or protruding member 116. As shown in FIG. 6, when latch 54 is coupled with seat 53a, U-shaped elastic member 70 allows the latch assembly 52 to be elastically operated. U-shaped elastic member 70 also ensures that latch assembly 52 stays coupled with seat 53*a*.

This device for securing the display panel to a base of a portable computer in a closed position simplifies the assembly of portable computers because the latch assembly slides into place and does not require any fastening, because a spring member gives elasticity to the latch assembly, the latch does not have to deform to engage the base, thus allowing the lifespan of the latch to be increased.

Although this preferred embodiment of the present invention has been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A device for securing a portable computer in a closed position, comprising:

said portable computer having a chassis comprising a monitor and a main body, said main body housing a memory, an input means, and a central processing unit driving a variable visual display device in said monitor, said monitor being pivotally mounted on said main body;

a latch assembly comprising:
  a body having a top surface and a side surface;
  a latch attached to said top surface of said body of said latch assembly for engagement with said main body;
  a boss attached to said side surface of said body of said latch assembly;
  a U-shaped elastic member having a rib;
  a holding member attached to an edge of said side surface of said body of said latch assembly opposite from said top surface of said body of said latch assembly, said holding member having a slit; and
  a spring member mounted on said boss; said monitor comprising:
    a structure having a front side bearing a screen of said variable visual display device; and
    a mounting receptacle for receiving said latch assembly and being positioned in a distal end of said monitor opposite from an axis of rotation between said monitor and said main body, said mounting receptacle having a slot and a protruding member for engaging with said latch assembly;

a seat on said main body having a cavity for receiving said latch of said latch assembly and said seat for engagement with said latch of said latch assembly;

said latch assembly for engagement with said mounting receptacle in said monitor, said latch assembly being engaged with said monitor when said rib of said U-shaped elastic member of said latch assembly is engaged with said slot in said mounting receptacle in said monitor and when said slit in said holding member of said latch assembly is engaged with said protruding member in said mounting receptacle in said monitor;

said monitor being secured in a closed position with said main body when said latch of said latch assembly is engaged with said seat and protrudes into said cavity in said main body; and said monitor being disengaged from said main body when pressure is applied on said side surface of said body of said latch assembly to compress said spring member and disengage said latch of said latch assembly from said seat on said main body.

2. The device of claim 1, further comprised of one said U-shaped elastic member being on each end of said latch assembly.

3. The device of claim 1, further comprised of said spring member being a U-shaped spring member.

4. The device of claim 1, further comprised of said latch assembly engaging said mounting receptacle using a sliding motion.

5. The device of claim 1, further comprised of said mounting receptacle having a substantially rectangular shape.

6. The device of claim 2, further comprised of two of said slot of said mounting receptacle being located in a sidewall of said mounting receptacle.

7. The device of claim 5, further comprised of said body of said latch assembly including two rectangular blades attached along a common edge to respectively form said top surface and said side surface of said body of said latch assembly, and said holding member of said latch assembly including a blade attached to said edge of said side surface of said body of said latch assembly opposite from said top surface of said body of said latch assembly, said blade of said holding member of said latch assembly including said slit of said holding member.

8. A device for securing a portable computer in a closed position, comprising:

said portable computer having a chassis comprising a monitor and a main body, said main body having a memory, an input means, and a central processing unit driving a variable visual display device in said monitor, said monitor being pivotally mounted on said main body;

a latch assembly comprising:
  a body having a top surface and a side surface;
  a latch attached to said top surface of said body of said latch assembly for engagement with said main body;
  a U-shaped elastic member having a rib;
  a holding member attached to an edge of said side surface of said body of said latch assembly opposite from said top surface of said body of said latch assembly, said holding member having a slit; said monitor comprising:
    a structure having a front side; and
    a mounting receptacle for receiving said latch assembly and being positioned in a distal end of said monitor opposite from an axis of rotation between said monitor and said main body, said mounting receptacle having a slot and a protruding member for engaging with said latch assembly;

a seat on said main body having a cavity for receiving said latch of said latch assembly and said seat for engagement with said latch of said latch assembly; and said latch assembly for engagement with said mounting receptacle in said monitor, said latch assembly being engaged with said monitor when said rib of said U-shaped elastic member of said latch assembly is engaged with said slot in said mounting receptacle in said monitor and when said slit in said holding member of said latch assembly is engaged with said protruding member in said mounting receptacle in said monitor.

9. The device of claim 8, further comprised of one said U-shaped elastic member being on each end of said latch assembly.

10. The device of claim 8, further comprised of said latch assembly engaging said mounting receptacle using a sliding motion.

11. The device of claim 8, further comprised of a boss attached to said side surface of said body of said latch assembly and a spring member mounted on said boss.

12. The device of claim 8, further comprised of said structure of said monitor comprising a substantially rectangular prism shape having said front side bearing a screen of said variable visual display device.

13. The device of claim 8, further comprising:
   said monitor being secured in a closed position with said main body when said latch of said latch assembly is engaged with said seat and protrudes into said cavity in said main body; and
   said monitor being disengaged from said main body when pressure is applied on said side surface of said body of said latch assembly to disengage said latch of said latch assembly from said seat on said main body.

14. The device of claim 8, further comprised of said mounting receptacle having a substantially rectangular shape.

15. The device of claim 9, further comprised of two of said slot of said mounting receptacle being located in a sidewall of said mounting receptacle.

16. The device of claim 11, further comprised of said spring member being a U-shaped spring member.

17. The device of claim 14, further comprised of said body of said latch assembly including two rectangular blades attached along a common edge to form said top surface and said side surface of said body of said latch assembly, and said holding member of said latch assembly including a blade attached to said edge of said side surface of said body of said latch assembly opposite from said top surface of said body of said latch assembly, said blade of said holding member of said latch assembly including said slit of said holding member.

18. A device for securing a portable computer in a closed position, comprising:
   said portable computer having a chassis comprising a monitor and a main body, said main body having a memory, an input means, and a central processing unit driving a variable visual display device in said monitor, said monitor being pivotally mounted on said main body;
   a latch assembly comprising:
      a body having a top surface and a side surface; and
      a latch attached to said top surface of said body of said latch assembly for engagement with said main body;
      said monitor comprising:
      a monitor housing having a front side; and
      a mounting receptacle for receiving said latch assembly and being positioned in said monitor housing in a distal end of said monitor opposite from an axis of rotation between said monitor and said main body;
   a seat on said main body having a cavity for receiving said latch of said a latch assembly and said seat for engagement with said latch of said latch assembly; and
   said latch assembly for engagement with said mounting receptacle in said monitor housing.

19. The device of claim 18, further comprised of said monitor housing comprising a substantially rectangular prism shape having said front side bearing a screen of said variable visual display device.

20. The device of claim 19, further comprised of said mounting receptacle having a slot and a protruding member for engaging with said latch assembly.

21. The device of claim 20, further comprised of said latch assembly further comprising:
   a boss attached to said side surface of said body of said latch assembly;
   a U-shaped elastic member having a rib for engagement with said slot in said mounting receptacle;
   a holding member attached to an edge of said side surface of said body of said latch assembly opposite from said top surface of said body of said latch assembly, said holding member having a slit; and
   a spring member mounted on said boss.

22. The device of claim 20, further comprised of said mounting receptacle having a substantially rectangular shape.

23. The device of claim 21, further comprised of said latch assembly being engaged with said monitor when said rib of said U-shaped elastic member of said latch assembly is engaged with said slot in said mounting receptacle in said monitor housing and when said slit in said holding member of said latch assembly is engaged with said protruding member in said mounting receptacle in said monitor housing.

24. The device of claim 21, further comprised of said mounting receptacle having a substantially rectangular shape, said body of said latch assembly including two rectangular blades attached along a common edge to form said top surface and said side surface on said body of said latch assembly, and said holding member of said latch assembly including a blade attached to said edge of said side surface of said body of said latch assembly opposite from said top surface of said body of said latch assembly, said blade of said holding member of said latch assembly including said slit of said holding member.

25. The device of claim 23, further comprised of one said U-shaped elastic member being on each end of said latch assembly.

26. The device of claim 25, further comprised of two of said slot of said mounting receptacle being located in a sidewall of said mounting receptacle.

27. The device of claim 26, further comprised of said monitor being secured in a closed position with said main body when said latch of said latch assembly is engaged with said seat and protrudes into said cavity in said main body; and
   said monitor housing being disengaged from said main body when pressure is applied on said side surface of said body of said latch assembly to disengage said latch of said latch assembly from said seat on said main body.

* * * * *